United States Patent Office 3,536,658
Patented Oct. 27, 1970

3,536,658
MASS COLORATION OF POLYMERIC PRODUCTS
Emil A. Wich, Plainfield, N.J., assignor to
Sandoz Inc., Hanover, N.J.
No Drawing. Filed July 26, 1967, Ser. No. 656,050
Int. Cl. C08f *45/66;* C08g *51/66;* C08b *17/66*
U.S. Cl. 260—41
16 Claims

ABSTRACT OF THE DISCLOSURE

Mass colored fusible polymeric products are prepared by melt blending fusible polymeric material, e.g., powdered poly(vinyl chloride), with N-vinyl-2-pyrrolidone and solvent-soluble dye.

---

This invention relates to mass coloration of polymeric material. More particularly this invention relates to a process for the mass coloration of fusible polymers by melt blending with N-vinyl-2-pyrrolidone and solvent-soluble dye. In addition, this invention relates to compositions useful in said process and products obtained by the use of said process.

There has been a continuing interest for many years in coloring polymeric materials to provide products which are commercially attractive, as well as for such functional purposes as color-coding. To obtain commercially acceptable products has often required use of expensive materials and techniques.

Particular problems have been encountered in attempts to use spirit-soluble dyes in mass coloring of polymers which have little or no bound oxygen, e.g., in producing colored transparent polyethylene packaging materials. The class of polymers which are low in bound oxygen includes widely used, low cost polymers such as polystyrene and polyethylene. The spirit-soluble dyes have been widely used in spirit printing inks and wood stains and are available in a wide variety of hues. Where proper solvating conditions are achieved, these dyes can be used to impart deep, rich attractive colors. When spirit-soluble dyes are first incorporated into a charge of divided polymer of the class which are low in bound oxygen in combination with a conventional volatile solvating agent having bound oxygen, e.g., methyl ethyl ketone, the mixture appears of satisfactory color. However, on applying heat to fuse the composition into a coherent mass, e.g., by melt extrusion, it is found that the volatile solvating agent evaporates, resulting in unsatisfactory coloring of the polymer, e.g., unattractive speckling, weak coloring or non-uniform color results. An obvious solution to the problem would be to use a vehicle or solvating agent for the dye which is substantially non-volatile at the temperatures employed in fusing the polymer. Various non-volatile organic liquids having bound oxygen, e.g., glycerol and lower alkyl phthalate esters, act as solvents or solvating agents for the spirit-soluble dye and yield fused polymer products of satisfactory color, but which are unsatisfactory in "migration" properties. In "migration" a component of the polymeric product migrates to the surface of the product causing such undesirable effects as staining of materials coming in contact with the product.

According to this invention mass coloration of polymeric material can be achieved conveniently without resort to expensive materials or techniques by the process of this invention which comprises melt blending polymeric material and solvent-soluble dye with N-vinyl-2-pyrrolidone in a weight ratio of from 2 to 20 parts of N-vinyl-2-pyrrolidone per part of the dye, preferably in a weight ratio of 6 to 12 parts of N-vinyl-2-pyrrolidone per part of the dye. The process of this invention is particularly useful in the mass coloring of polymers which are low in bound oxygen, i.e. having no more than 5% by weight of oxygen, with spirit-soluble dyes to obtain products having satisfactory color and migration properties.

By the term melt blending is meant admixing a composition comprising fusible polymer, suitable dye, and N-vinyl-2-pyrrolidone in proper proportion under conditions of heat and agitation whereby the polymer undergoes a temporary transition from its normally solid to a molten state, and uniform dispersion of the dye throughout the mass is achieved. The conditions of heat and agitation may be provided by conventional means, e.g., by banding the composition on a two-roll mill, melt extrusion, or stirring a charge of composition in a heated vessel at temperatures at which the polymer component is molten.

Fusible polymers suitable for use in the practice of this invention include homopolymers and copolymers of olefins, e.g., ethylene, propylene, 1-butene and styrene; homopolymers and copolymers of vinyl monomers, e.g., vinyl chloride, vinyl acetate and vinylidene chloride; homopolymers and copolymers of acrylic monomers, e.g., acrylonitrile and methyl methacrylate, and cellulosics, e.g., cellulose acetate, as well as condensates such as the thermoplastic polyamides and polyesters.

The dyes suitable for use in the practice of this invention are of the class of solvent-soluble dyes, which class includes two classes of dyes, namely, spirit-soluble dyes, e.g., Solvent Red 90 and oil-soluble dyes, e.g., Solvent Red 26. The classes of solvent-soluble dyes, oil-soluble dyes and spirit-soluble dyes, as well as members falling within said classes of dyes, are well understood in the art.

The process of this invention is particularly useful in mass coloring fusible polymers which are low in bound oxygen, i.e. hydrocarbon and halohydrocarbon resins, such as polyolefin, e.g., polypropylene, linear and branched polyethylene, polystyrene and polybutene-1, and vinyl resins having little or no oxygen-containing component, such as vinyl acetate, e.g., poly(vinyl chloride). The fusible polymers which are high in bound oxygen, (i.e. having over 5%) which are suitable for use in the practice of this invention include cellulosics, e.g., cellulose acetate, thermoplastic polyamides and polyesters, as well as vinyl resins and acrylic resins having a high proportion of oxygen-containing component, e.g., vinyl acetate, methyl methacrylate and methacrylamide.

The fusible polymer, suitable dye and N-vinyl-2-pyrrolidone components may be introduced in proper proportions into a melt-blending zone, e.g., by metering into an melt-extruder, as separate streams or added as separate charges into a mixing kettle or two-roll mill. However, it is preferable to first prepare a paste of the dye and N-vinyl-2-pyrrolidone components and then admix the paste with the polymer. As is well known in the art, to effect melt blending it is not strictly necessary to maintain the mixing apparatus at temperatures at or above the softening points of the polymeric material component, as localized heat and pressures on the composition under treatment due to such factors as motion and friction within the apparatus can effect melting conditions as is required in the practice of the invention. For example, in melt blending by means of a two-roll mill, it is conventional practice to adjust the space between the rolls and the temperature of one or both rolls and repeat passage of the charge composition through the mill so as to achieve banding, i.e. conversion of the charge composition to a coherent uniform dough-like mass.

The colored polymeric materials obtained by the above-described process of this invention may be directly worked to produce shaped end products, e.g., fibers, ribbons, sheets, tubes, toys, squeeze bottles, household articles and the like, or alternatively, converted to a convenient form for storage or handling for subsequent working, e.g., particles, pellets, chips, rods and the like, as desired.

The physical nature, i.e. the shape and size of the fusible polymeric material is not critical to the practice of this invention and conventional forms of the polymeric material may be used, e.g., granules, pellets, chips and powder. Advantageously, the polymeric material is introduced into the melt blending zone in a divided form having no dimension greater than 10 millimeters, and preferably no dimension greater than 4 millimeters.

A composition of this invention is a substantially uniform mixture comprising fusible polymer, solvent-soluble dye and N-vinyl-2-pyrrolidone in a weight ratio of from 2 to 20 parts of N-vinyl-2-pyrrolidone per part of the dye, preferably from 6 to 12 parts of N-vinyl-2-pyrrolidone per part of the dye.

An additional composition of this invention is a paste which is a substantially uniform mixture consisting essentially of solvent-soluble dye and N-vinyl-2-pyrrolidone in a weight ratio of from 2 to 20 parts of N-vinyl-2-pyrrolidone per part of the dye, preferably in a weight ratio of from 6 to 12 parts of N-vinyl-2-pyrrolidone per part of the dye. Such a composition may be used to furnish all or part of the dye component and/or N-vinyl-2-pyrrolidone component in preparing compositions of this invention comprising fusible polymer, suitable dye and N-vinyl-2-pyrrolidone.

An additional composition of this invention is a "pre-mix," i.e. a substantially uniform, free-flowing mixture comprising fusible polymeric material, suitable dye, and N-vinyl-2-pyrrolidone in a ratio by weight of from 2 to 20 parts of N-vinyl-2-pyrrolidone per part of the dye, preferably in a weight ratio of 6 to 12 parts of N-vinyl-2-pyrrolidone per part of the dye. The pre-mix is useful as a dye-concentrate, e.g., by admixing one part by weight of such a pre-mix having a dye content of 4% by weight with three parts by weight of polymer, a final polymer composition having a dye content of 1% by weight is obtained. Preferably the pre-mix is blended with the additional polymer before the melt blending step, e.g., by tumbling the charges of polymer and pre-mix together at ambient temperatures, although in practice the pre-mix and additional polymer may be introduced into a melt blending zone as separate charges or streams.

The pre-mix is conveniently prepared by admixing finely divided fusible polymer with N-vinyl-2-pyrrolidone and suitable dye under non-melting conditions until a substantially uniform composition is obtained. Preferably the mixing is effected at room temperature, e.g., by tumbling or shaking. The dye preferably is introduced as a paste in N-vinyl-2-pyrrolidone. The proportion of the polymer component to the N-vinyl-2-pyrrolidone component should be at least sufficient to retain the free flowing property of the finely divided polymer, so as to provide a free-flowing pre-mix. Finely-divided fusible polymer used in preparing the pre-mix, advantageously has an average particle size no greater than 4 millimeters, and preferably is at least 100 mesh.

It is contemplated that additives conventionally incorporated in polymeric compositions, e.g., light stabilizers, plasticizers, opacifiers, lubricants, fillers and antioxidants may be included in the compositions of this invention without departing from the scope of this invention. It is also contemplated that the fusible polymeric material used in the compositions of this invention may be a single polymer or a compatible mixture of polymers, varying, e.g., in chemical or physical characteristics, without departing from the scope of this invention.

The selection of individual solvent-soluble dyes used in the compositions of this invention is based on such considerations as compatibility with the polymer component, and requirements of the end product, such as light fastness. The proportions of the dye component with respect to the polymer component of the compositions of this invention is not critical, being selected based on such considerations as intensity of color desired, economy and avoidance of adverse influence on the physical properties of the ultimate fused polymer product.

Similarly the proportions of N-vinyl-2-pyrrolidone component to the polymer component of the compositions of this invention is not critical, but is selected based on such considerations as economy and avoidance of adverse influence on the physical properties of the ultimate fused polymeric product.

Examples illustrating this invention, as well as a comparative example not within the scope of this invention, are given below.

In the examples the dye is used as powder. It is preferred to use powdered dyes in the practice of this invention, although the particle size of the dye is not critical. As is well-understood in the art, the use of finely-divided dye in preparing compositions is advantageous, e.g., it promotes uniform-mixing and solvating. As is also well-understood in the art, in preparing dye-containing compositions the dyes can be introduced into compositions in the ultimate particle size desired or the dye can be introduced as relatively large size material and reduced to the desired size during the admixing of the composition, e.g., by milling. In the pre-mix compositions and pastes of this invention it is preferred that the dye be at least 100 mesh or finer.

EXAMPLE 1A 0.5 g. of Solvent Red 90 (a spirit-soluble dye), 4.0 g. of N-vinyl-2-pyrrollidone and 200 g. of powdered polypropylene resin[1] are placed in a container and shaken for 15 minutes in an automatic shaker to achieve uniform mixing. The contents of the container are then milled on a two-roll mill preheated to 360° F. for 15 minutes to effect banding. The banded mass is then pressed at 325° F. and 10,000 p.s.i. for 2 minutes to form a thin plaque (0.02 inch thick).

The resultant plaque has excellent color dispersion and color value.

EXAMPLE 1B

For purpose of comparison the procedure described in Example 1A is repeated, except that the N-vinyl-2-pyrrolidone is omitted, resulting in a plaque having poor color dispersion and poor color value.

EXAMPLE 2A

The procedure described in Example 1A is repeated, except that the dye is substituted by an equal weight of Solvent Orange 41 (a spirit-soluble dye). The plaque so-obtained has excellent color dispersion and color value.

EXAMPLE 2B

The procedure described in Example 1A is repeated, except that the polypropylene resin is substituted by an equal weight of pelleted high-density polyethylene[2] and that one roll of the two-roll mill is unheated and the other roll is preheated to 330° F. The resultant plaque has excellent color dispersion and color value.

EXAMPLE 2C

The procedure described in Example 1A is repeated except that the polypropylene resin is substituted by an equal weight of pelleted polystyrene[3] and that one roll of the two-roll mill is unheated and the other roll is preheated to 330° F. The resultant plaque has excellent color dispersion and color value.

EXAMPLE 2D

The procedure described in Example 1A is repeated except that the polypropylene resin is substituted by a mixed formulation consisting of 200 g. of poly(vinyl chloride)

---

[1] "Pro-fax" 6511 of Hercules, Inc.; an uncolored polypropylene homopolymer having a nominal melt flow ($I_2$ at 230° C.) of 4.0

[2] "Hi-fax" 1400 J of Hercules, Inc.; uncolored Polyethylene homopolymer, density of 0.945, nominal melt index ($I_2$ at 190° C.) of 0.6. Injection molding grade, in the form of pellets averaging 3/32 inch in diameter and 3/32 inch long.

[3] "SMD" 3500 of Union Carbide Corporation; uncolored clear general purpose styrene homopolymer pellets of ovoid cross section averaging about 1/16 inch by 3/32 inch and 1/8 inch long.

resin,[4] 11 g. of epoxided soya bean oil,[5] 6.0 g. of barium-cadmium stabilizer,[6] 1.0 g. of zinc stabilizer [7] and 2.0 g. of stearic acid, and the two-roll mill is preheated to 330° F. The resultant plaque has an excellent color dispersion and color value.

EXAMPLE 3

Pre-mix 4 g. of Solvent Blue 47 (a spirit-soluble dye) and 40 g. of N-vinyl-2-pyrrolidone are blended to form a pasty mixture. The mixture is added to 106 g. of polypropylene resin with stirring until a uniform free-flowing pre-mix is obtained.

3.75 g. of the pre-mix are added to 96.25 g. of polypropylene resin in a 1 quart can. The can is sealed and shaken for 5 minutes on an automatic shaker to obtain a thoroughly mixed composition. The composition is then banded on a two-roll mill preheated to 360° F. by milling for 15 minutes. The banded mass is then pressed at 325° F. and 10,000 p.s.i. for 2 minutes to form a thin plaque (0.02 inch thick) having excellent color dispersion and color value.

EXAMPLE 4

Further tests using various combinations of polymers and dyes are carried out by the following procedure:

0.25 g. of dye is added to 2.0 g. of N-vinyl-2-pyrrolidone at room temperature (20° C.) with stirring to form a paste; the paste is added to 100 g. of divided polymer in a one quart can; the can is sealed and shaken on an automatic shaker for 5 minutes to obtain a thoroughly mixed composition; the composition is banded on a two-roll mill by milling for 10 minutes; the preheat conditions being adjusted for the various polymers as given in Examples 2A, 2B, 2C and 2D, and the banded composition pressed into a plaque as described in Example 1A.

Satisfactory results are obtained in tests where the dye is Solvent Red 90 (a spirit-soluble dye) and the polymer is either polystyrene, polypropylene resin, high-density polyethylene or a rigid vinyl formulation.[8] Satisfactory results are also obtained in tests where the polymer is Solvent Red 26 (an oil-soluble dye).

Satisfactory results are also obtained in tests where the polymer is polypropylene resin and the dye is a spirit-soluble dye as listed below:

Solvent Red 91
Solvent Red 92
Solvent Red 89
Solvent Orange 41
Solvent Yellow 62
Solvent Green 19
Solvent Blue 44
Solvent Blue 47

EXAMPLE 5

A thin, mass colored polypropylene resin plaque (0.015 inch thick) is prepared according to the procedure described in Example 1A and 4 colored samples (1½ inch squares) are cut from the colored plaque. A thin white plaque (0.015 inch thick) is prepared from 200 g.

[4] "Exon" 9274 of Firestone Plastics Division of Firestone Tire & Rubber Company; uncolored powdered vinyl chloride homopolymer.
[5] "Paraplex G-62" of Rohm & Haas Company; epoxidized soya bean oil, density (25° C./15° C.) of 0.993.
[6] Mark M of Argus Chemical Corporation; barium-cadmium phosphite system (liquid phenate system).
[7] Mark PL of Argus Chemical Corporation; liquid zinc organic complex.
[8] The formulation of Example 2D is used in ½ proportions.

of polypropylene resin and 4.0 g .of powdered titanium dioxide pigment [9] by mixing, milling and pressing as described in Example 1A. Four white samples (1½ inch squares) are cut from the white plaque. One colored sample is placed (face-to-face) on each of the white samples and the pairs of samples are pressed together at 1 p.s.i. for one, week at room temperature (20° C.).[10] After which period the white samples are inspected visually for staining.

Staining is not found on the white samples indicating the satisfactory migration properties of the colored samples which are prepared according to this invention, i.e. the colored samples are non-migrating.

[9] "RA 50" of Titanium Pigments Corporation; rutile titanium dioxide.
[10] To obtain 1 p.s.i. pressure, a stack is formed in which a 1½ inch square metal spacer (aluminum) is used to separate each pair of samples and a 1 kg. weight is placed on top of the stack. The stack is formed by first putting down a metal spacer, placing a pair of samples on the face of the spacer, then covering the pair of samples with another metal spacer, another pair of samples is added and covered by a spacer, and the series continued until all four pairs of samples are stacked. Thus there is a metal spacer at the bottom and the top of the stack.

What is claimed is:

1. A process for preparing a mass-colored fused polymeric composition which comprises melt blending (A) fusible polymer, with (B) at least an effective amount of solvent-soluble dye and (C) from 2 to 20 parts by weight of N-vinyl-2-pyrrolidone per part by weight of the dye.

2. A process of claim 1 wherein the ratio, by weight, of the N-vinyl-2-pyrrolidone is from 6 to 12 parts per part of the dye.

3. A process of claim 1 wherein the dye is a spirit-soluble dye and fusible polymer has no more than 5%, by weight, of bound oxygen.

4. A process of claim 3 wherein the fusible polymer is polypropylene resin.

5. A process of claim 1 wherein the dye and the N-vinyl-2-pyrrolidone are admixed, and the resultant mixture then admixed with the fusible polymer.

6. A composition useful for the preparation of a mass colored fused polymeric composition comprising (A) fusible polymer, (B) at least an effective amount of solvent-soluble dye, and (C) from 2 to 20 parts by weight of N-vinyl-2-pyrrolidone per part by weight of the dye.

7. A composition of claim 6 wherein the ratio, by weight, of the N-vinyl-2-pyrrolidone is from 6 to 12 parts per part of the dye.

8. A composition of claim 6 wherein the fusible polymer has no more than 5%, by weight, of bound oxygen and the dye is a spirit-soluble dye.

9. A composition of claim 8 wherein the fusible polymer is polypropylene resin.

10. A composition of matter comprising in intimate admixture a solvent-soluble dye and from 2 to 20 parts by weight of N-vinyl-2-pyrrolidone, per part by weight of the dye.

11. A composition of claim 10 wherein the dye is a spirit-soluble dye.

12. A composition of claim 10 wherein the ratio, by weight, of the N-vinyl-2-pyrrolidone is from 6 to 12 parts per part of the dye.

13. A pre-mix composition which is substantially uniform and free-flowing comprising (A) finely divided fusible polymer having no dimension greater than 4 millimeters, (B) a solvent-soluble dye and (C) from 2 to 20 parts by weight of N-vinyl-2-pyrrolidone per part, by weight, of the dye.

14. A pre-mix composition of claim 13 wherein the ratio, by weight, of the N-vinyl-2-pyrrolidone is from 6 to 12 parts per part of the dye.

15. A pre-mix composition of claim 13 wherein the fusible polymer has no more than 5%, by weight, of bound oxygen and the dye is a spirit-soluble dye.

16. A pre-mix composition of claim 15 wherein the polymer is polypropylene resin.

References Cited

UNITED STATES PATENTS

| 3,088,837 | 5/1963 | Prescott et al. | |
| 3,156,575 | 11/1964 | Gaglione et al. | |
| 3,256,364 | 6/1966 | Bryant et al. | 260—895 |

FOREIGN PATENTS

| 781,161 | 8/1957 | Great Britain. |
| 834,160 | 5/1960 | Great Britain. |
| 875,133 | 8/1961 | Great Britain. |

MORRIS LIEBMAN, Primary Examiner

J. H. DERRINGTON, Assistant Examiner

U.S. Cl. X.R.

106—176, 193; 260—37, 40